Figure 1:
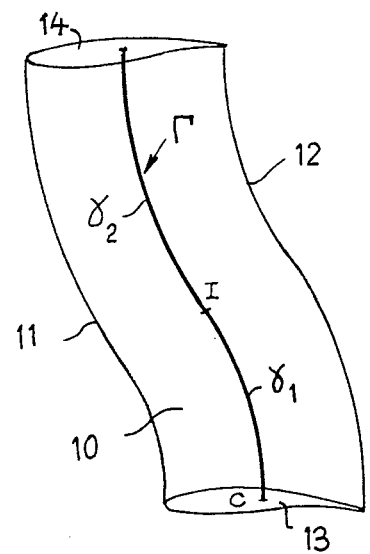

United States Patent [19]

Vera

[11] Patent Number: 4,737,077

[45] Date of Patent: Apr. 12, 1988

[54] PROFILED BLADE OF A FAN AND ITS APPLICATION IN MOTOR-DRIVEN VENTILATING DEVICES

[75] Inventor: Jean-Claude Vera, Valentigney, France

[73] Assignee: Aciers et Outillage Peugeot, Audincourt, France

[21] Appl. No.: 95,499

[22] Filed: Sep. 11, 1987

[30] Foreign Application Priority Data

Sep. 12, 1986 [FR] France ................. 86 12811

[51] Int. Cl.$^4$ ............................................. F04D 29/24
[52] U.S. Cl. ............................. 416/242; 416/169 A; 416/DIG. 2
[58] Field of Search ............... 416/242, 243, 238, 239, 416/DIG. 2, 169 A

[56] References Cited

U.S. PATENT DOCUMENTS

| | | | |
|---|---|---|---|
| 53,902 | 4/1866 | Tripp | 416/242 |
| 1,806,345 | 5/1931 | Halvorsen | 416/238 |
| 2,095,162 | 10/1937 | Wood | 416/234 |
| 4,334,824 | 6/1982 | Tsuchikawa et al. | 416/238 |
| 4,569,631 | 2/1986 | Gray, III | 416/DIG. 2 |

FOREIGN PATENT DOCUMENTS

| | | | |
|---|---|---|---|
| 1903642 | 8/1970 | Fed. Rep. of Germany . | |
| 2135943 | 2/1973 | Fed. Rep. of Germany | 416/183 |
| 2459387 | 1/1981 | France . | |
| 192898 | 11/1984 | Japan | 416/242 |
| 2151310 | 7/1985 | United Kingdom . | |
| 1038612 | 8/1983 | U.S.S.R. | 416/242 |

Primary Examiner—Robert E. Garrett
Assistant Examiner—John T. Kwon
Attorney, Agent, or Firm—Sughrue, Mion, Zinn, Macpeak and Seas

[57] ABSTRACT

The blade has an axis ($\Gamma$) which is the locus of the thrust centers (C) of its cross-sections parallel to its foot (13) which has a connecting point (I) between an abyssal arc ($\gamma_1$) whose concavity faces toward the leading edge (11) and a summit arc ($\gamma_2$) whose concavity faces toward the trailing edge (12) of the blade.

7 Claims, 2 Drawing Sheets

PROFILED BLADE OF A FAN AND ITS APPLICATION IN MOTOR-DRIVEN VENTILATING DEVICES

The present invention relates to fan blades, and more particularly to a profiled fan blade for a motor-driven ventilating device in particular for motor vehicles.

An object of the invention is to improve the aeraulic performances, to increase the static efficiency and to increase the dynamic air stirring capacities of especially axial fans. The invention is more particularly applicable to motor-driven ventilating devices with which cooling or air conditioning units of motor vehicles are equipped.

The invention concerns more particularly the blades of fans adaptd to be placed on the upstream side, relative to the direction of flow of the fluid, of the units to be cooled, such as heat exchangers, for example radiators or condensers, through which the fans force the fluid, in particular air, and in which these units to be cooled are located in the wake of the fan.

For a given flow, in order to increase the calorific power extracted from a unit to be cooled, such as a condenser or a radiator of a vehicle, the air stream produced by the fan must be diffused over the largest possible surface area by ensuring both a turbulent stirring of the air without increasing in a marked manner the total pressure drop on the downstream side of the trailing edge of the fan blades.

To achieve this, in accordance with the invention, it is arranged that the air flow lines located in the layers close to the centre of the fan describe centripetal trajectories while those located in the layers close to its periphery follow centrifugal trajectories. In this way, in vertical alignment with the intrados and the extrados of each blade, this aerodynamic phenomenon produces the sliding of the end layers as a result of the upsetting of the radial equilibrium of the parietal current lines in respect of the fan blade sections located in the vicinity of the centre and of the periphery, and this displacement of the end layers occurs while avoiding the detachment of the air from the extrados of the concerned sections.

The object of the invention is to achieve this while avoiding the aforementioned difficulties by means of a specially profiled blade.

A profiled blade for a fan according to the invention is of a type which has the properties recited in the preamble of the generic claim and which has the features set forth in the characterizing part of this claim and of the claims dependent therefrom.

Figure 2:
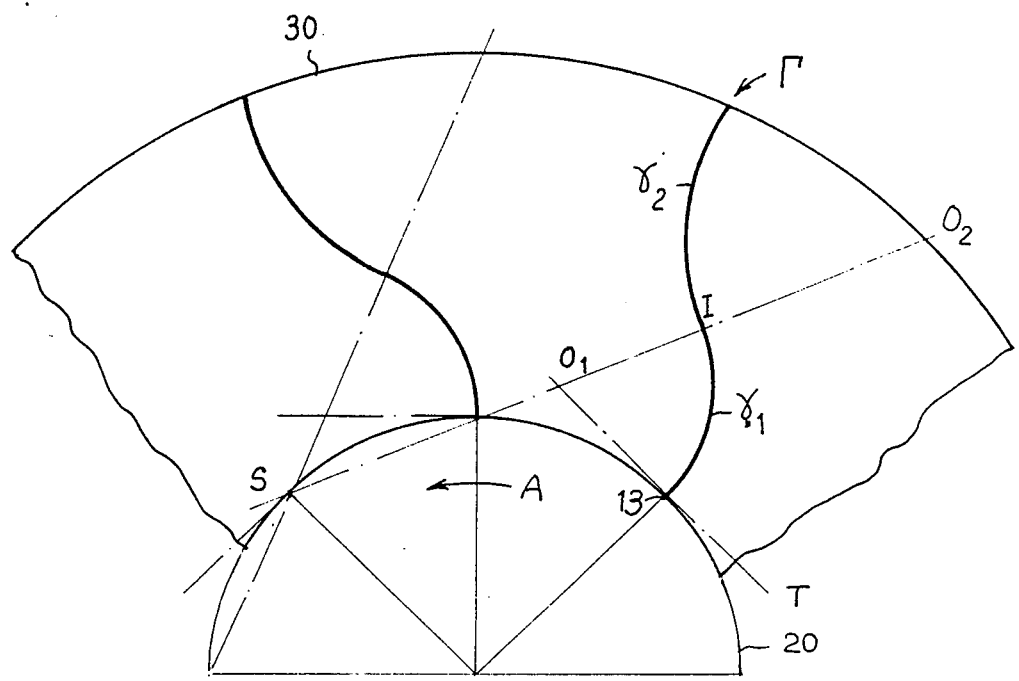

Further features of the invention will be clear from the following description with reference to the accompanying drawing which is given solely by way of example and in which:

FIG. 1 is a diagram of a preferred embodiment of a fan blade according to the invention, and FIG. 2 is a graph illustrating how the connecting point in the preferred embodiment is determined.

Figure 2A:
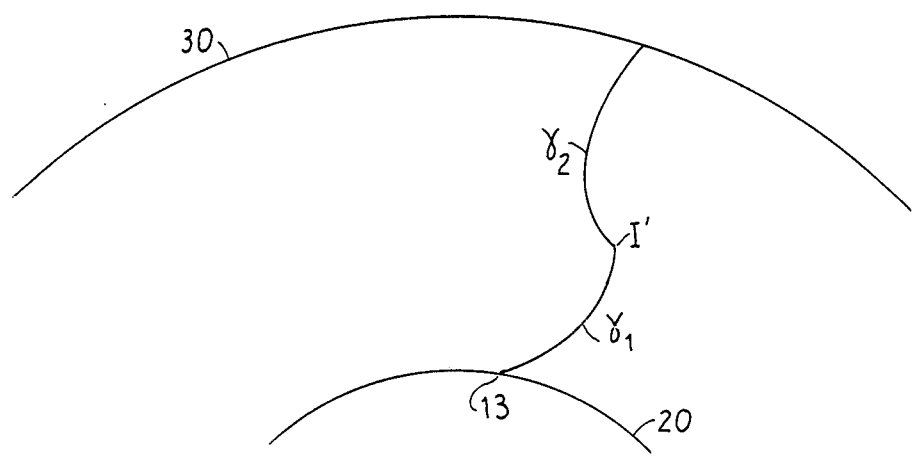
Figure 2B:
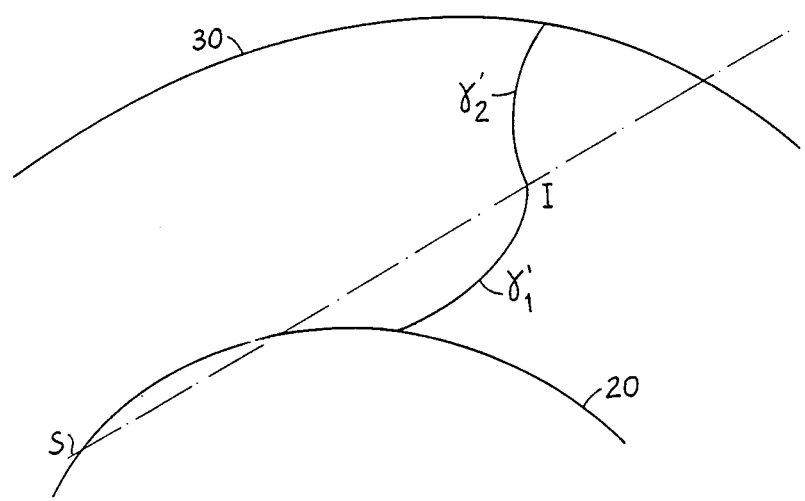

FIGS. 2(a) and 2(b) diagrammatically illustrate variations of the preferred embodiment.

FIG. 1 shows a fan blade 10 according to the invention. As can be seen, this fan blade has a leading edge 11 and a trailing edge 12 and a foot 13 and a head 14. This blade has a cross-sectional profile whose locus Γ of the thrust centres C has a connection point I, for example an inflexion point or angular point. As can be seen, this fan blade has between its foot 13 and its head 14 an abyssal arc $\gamma_1$ whose concavity faces in the upstream direction, i.e. the leading edge, and a summit arc $\gamma_2$ whose concavity faces in the downstream direction, i.e. the trailing edge. These arcs are arcs of a cone or a circle.

FIG. 2 will permit a better understanding of the manner in which the connecting point I on the locus of the thrust centres C of the cross-sectional profiles of the blade is determined and of the manner in which the radii of curvature and the centres of curvature of the abyssal $\gamma_1$ and summit $\gamma_2$ arcs ares established. There has been shown diagrammatically a hub 20 of a fan having eight blades which is adapted to rotate in the direction shown by arrow A. There is drawn the tangent T to the foot circle, here coincident with the hub for reasons of convenience, of the blade of rank one and there is drawn the secant S which joins the feet of the two blades located on the upstream side of rank two and three. This straight line S through the feet intersects the tangent T at a first point $O_1$ and intersects the head circle 30 of the blade at a second point $O_2$. These two points are the centres of curvature of the abyssal arc $\gamma_1$ and the summit arc $\gamma_2$ respectively of the blade in question. The radius of curvature of the abyssal arc is equal to the distance between the first point of intersection $O_1$ and the foot 13 of the first blade. The intersection of this arc of a circle with the straight line S of the feet is the connecting point I, and the distance between this connecting point I and the intersection $O_2$ of the straight line S through the feet with the head circle 30 determines the radius of curvature of the summit arc $\gamma_2$.

FIG. 2 illustrates the manner just explained in which the locus of the thrust centres C of the cross-sectional profiles of the blade according to the invention is constructed.

In the embodiment illustrated in FIGS. 1 and 2, the abyssal and summit arcs have a tangent common to the connecting point I. If necessary, instead of this point of inflexion, there may be provided an angular point I' of connection of these two arcs, as diagrammatically shown in FIG. 2(a). For this, it is sufficient that one of the two centres of curvature of these arcs be located outside the straight line S through the feet.

It will also be observed that, if need be, the leading and trailing edges may also have inflexion or angular points, as the curve Γ.

In the foregoing, there has been described an embodiment of a fan which has eight blades according to the invention, whose abyssal and summit arcs are portions of a circle. It must be clear that such a fan may have a different number of blades and that these abyssal and summit arcs may be of cones other than circles, for example ellipses, diagrammatically shown in FIG. 2(b) as $\gamma_1'$ and $\gamma_2'$, respectively.

When a ventilating device is used which is equipped with a fan whose blades are in accordance with the invention, notable gains are achieved. A motor-driven ventilating device equipped with a fan having conventional blades whose outside diameter is about 305 mm and which produces a rate of flow of air of 1 600 cu.m/hour under a mean pressure of 14 mm of water has an overall static efficiency of about 26% and consumes 240 W. A ventilating device equipped with a fan which has the same size and has blades which have a configuration in accordance with the invention, increases, under the same conditions, this efficiency to a little more than 34% for an absorbed power which is only 193 W.

Owing to the fan blades according to the invention, it is possible to notably reduce the consumption of energy while improving the efficiency.

The fan blades according to the invention are well suited to automobile applications, for example to ventilating devices which are mounted within a fixed cowling which extends to the element to be cooled to avoid any recirculation of air between the high pressure and low pressure sides surrounding the ventilating device.

It will be clear that other applications are possible, in addition to the automobile field which has been indicated solely by way of example.

I claim:

1. A blade for a fan of in particular a ventilating device, which blade has a foot and a head and an axis including a connecting point between said foot and said head which separates an abyssal arc extending from said connecting point to said foot of the blade from a summit arc extending from said connecting point to said head of the blade, said abyssal arc being concave in the upstream direction and said summit arc being concave in the downstream direction, relative to the direction of rotation of the blade, the abyssal arc having a centre of curvature which is determined by an intersection point of a tangent to said blade foot with a straight line which joins the feet of two blades located immediately on the upstream side relative to the direction of rotation of the blade, and said abyssal arc having a radius of curvature which is equal to the distance between (a) said point of intersection of said tangent and said straight line through said feet and (b) the foot of the blade.

2. A blade according to claim 1, wherein the summit arc has a centre of curvature determined by the intersection of said straight line joining said feet of the blades located immediately on the upstream side with the head circle, and the radius of curvature of said summit arc is equal to the distance between said connecting point and the intersection of said straight line through said feet with said head circle.

3. A blade according to claim 1, wherein said connecting point is a point of inflexion.

4. A blade according to claim 1, wherein said connecting point is an angular point.

5. A blade according to claim 1, wherein said abyssal and summit arcs are portions of cones.

6. A blade according to claim 1, wherein said abyssal and summit arcs are portions of circles.

7. A blade for a fan of a motor-driven ventilating device in particular for automobiles, said blade having a foot and a head and an axis and including a connecting point between said foot and said head which separates an abyssal arc extending from said connecting point to said foot of the blade from a summit arc extending from said connection point to said head of the blade, said abyssal arc being concave in the upstream direction and said summit arc being concave in the downstream direction, relative to the direction of rotation of the blade, the abyssal arc having a centre of curvature which is determined by an intersection of a tangent to said blade foot with a straight line which joins the feet of two blades located immediately on the upstream side relative to the direction of rotation of the blade, and said abyssal arc having a radius of curvature which is equal to the distance between a point of intersection of said tangent and said straight line through said feet of the foot of the blade.

* * * * *